US008291426B2

(12) United States Patent
Gustafsson et al.

(10) Patent No.: US 8,291,426 B2
(45) Date of Patent: Oct. 16, 2012

(54) MEMORY ALLOCATORS CORRESPONDING TO PROCESSOR RESOURCES

(75) Inventors: Niklas Gustafsson, Bellevue, WA (US); Paul Ringseth, Bellevue, WA (US); Philip Lucido, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 12/131,471

(22) Filed: Jun. 2, 2008

(65) Prior Publication Data
US 2009/0300638 A1 Dec. 3, 2009

(51) Int. Cl.
G06F 9/46 (2006.01)
G06F 12/00 (2006.01)

(52) U.S. Cl. ......... 718/104; 718/102; 711/100; 711/152

(58) Field of Classification Search .................. None
See application file for complete search history.

(56) References Cited

U.S. PATENT DOCUMENTS

| | | | |
|---|---|---|---|
| 4,685,125 A | 8/1987 | Zave | |
| 5,388,215 A | 2/1995 | Baker et al. | |
| 5,784,699 A * | 7/1998 | McMahon et al. | 711/171 |
| 6,219,678 B1 * | 4/2001 | Yelland et al. | 1/1 |
| 7,444,636 B2 * | 10/2008 | Noel et al. | 718/104 |
| 2002/0129085 A1 | 9/2002 | Kubala et al. | |
| 2003/0172149 A1 | 9/2003 | Edsall et al. | |
| 2006/0005190 A1 | 1/2006 | Vega et al. | |
| 2006/0136653 A1 | 6/2006 | Traut et al. | |
| 2006/0259732 A1 | 11/2006 | Traut et al. | |
| 2006/0259818 A1 | 11/2006 | Howell et al. | |
| 2007/0005870 A1 | 1/2007 | Neiger et al. | |
| 2007/0226795 A1 | 9/2007 | Conti et al. | |

OTHER PUBLICATIONS

"Virtualization Concepts", Date: May 18, 2007, http://www-941.ibm.com/collaboration/wiki/display/virtualization/Virtualization+Concepts.
Kemp Mike, "Pulling the Plug on Today's Blade Server Architectures", Date: Sep. 2006, http://enterprisenetworksandservers.com/monthly/art.php?2542.
Berger, Emery D. et al., "Hoard: A Scalable Memory Allocator for Multithreaded Applications" Nov. 12-15, 2000. Copyright A.C.M. 2000 1-58113-317-0/00/011.
Schneider, Scott et al., "Scalable Locality-Conscious Multithreaded Memory Allocation" ISMM '06, Jun. 10-11, 2006, Ottawa, Ontario, Canada. Copyright 2006 ACM 1-59593-221/6/06/0006.
Gloger, Wolfram et al., "Dynamic Memory Allocator Implementations in Linux System Libraries" http://www.dent.med.uni-muenchen.de/~wmglo/malloc-slides.html.
Kahan, Simon et al., ""MAMA!" A Memory Allocator for Multithreaded Architectures", PPoPP'06 Mar. 29-31, 2006, New York, New York, USA. Copyright 2006 ACM 1-59593-189-9/06/0003.
Hudson, Richard L. et al., "McRT-Malloc—A Scalable Transactional Memory Allocator" ISMM'06, Jun. 10-11, 2006, Ottawa, Ontario, Canada. Copyright 2006 ACM 1-59593-221-6/06/0006.
Michael, Maged M. et al., "Scalable Lock-Free Dynamic Memory Allocation", PLDI'04, Jun. 9-11, 2004, Washington, DC, U.S.A. Copyright 2004 ACM 1-58113-807-5/04/0006.

* cited by examiner

*Primary Examiner* — Jennifer To (57) ABSTRACT

A memory allocator is provided for each processor resource in a process of a computer system. Each memory allocator includes a set of pages, a locally freed list of objects, and a remotely freed list of objects. Each memory allocator requests the pages from an operating system and allocates objects to all execution contexts executing on a corresponding processing resource. Each memory allocator attempts to allocate an object from the locally freed list before allocating an object from the remotely freed list or an allocated page.

15 Claims, 5 Drawing Sheets

MEMORY ALLOCATORS CORRESPONDING TO PROCESSOR RESOURCES

BACKGROUND

Processes that execute in a computer system typically request memory allocations to perform work using the memory. These processes may execute in computer systems with more than one processing resource where one or more memory allocators may be provided to process the memory requests. Each process may be configured to taking advantage of available concurrency on a computer system by allowing different parts of the process to be executed on different processing resources simultaneously. In a process that uses such concurrency, managing the locality of memory accesses may be of importance to the performance of the process. In addition, accessing one or more memory allocators from multiple processing resources typically involves including synchronization mechanisms which adds significant overhead to the memory allocation process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A memory allocator is provided for each processor resource in a process of a computer system. Each memory allocator includes a set of pages, a locally freed list of objects, and a remotely freed list of objects. Each memory allocator requests the pages from an operating system and allocates objects to all execution contexts executing on a corresponding processing resource. Each memory allocator attempts to allocate an object from the locally freed list before allocating an object from the remotely freed list or an allocated page.

A processing resource of a locally allocated object may cause the object to be freed by adding the object to the locally freed list of the memory allocator corresponding to the processing resource. A processing resource of a remotely allocated object may cause the object to be freed by adding the object to the remotely freed list of the memory allocator that allocated the object (i.e., the memory allocator corresponding to another processing resource).

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
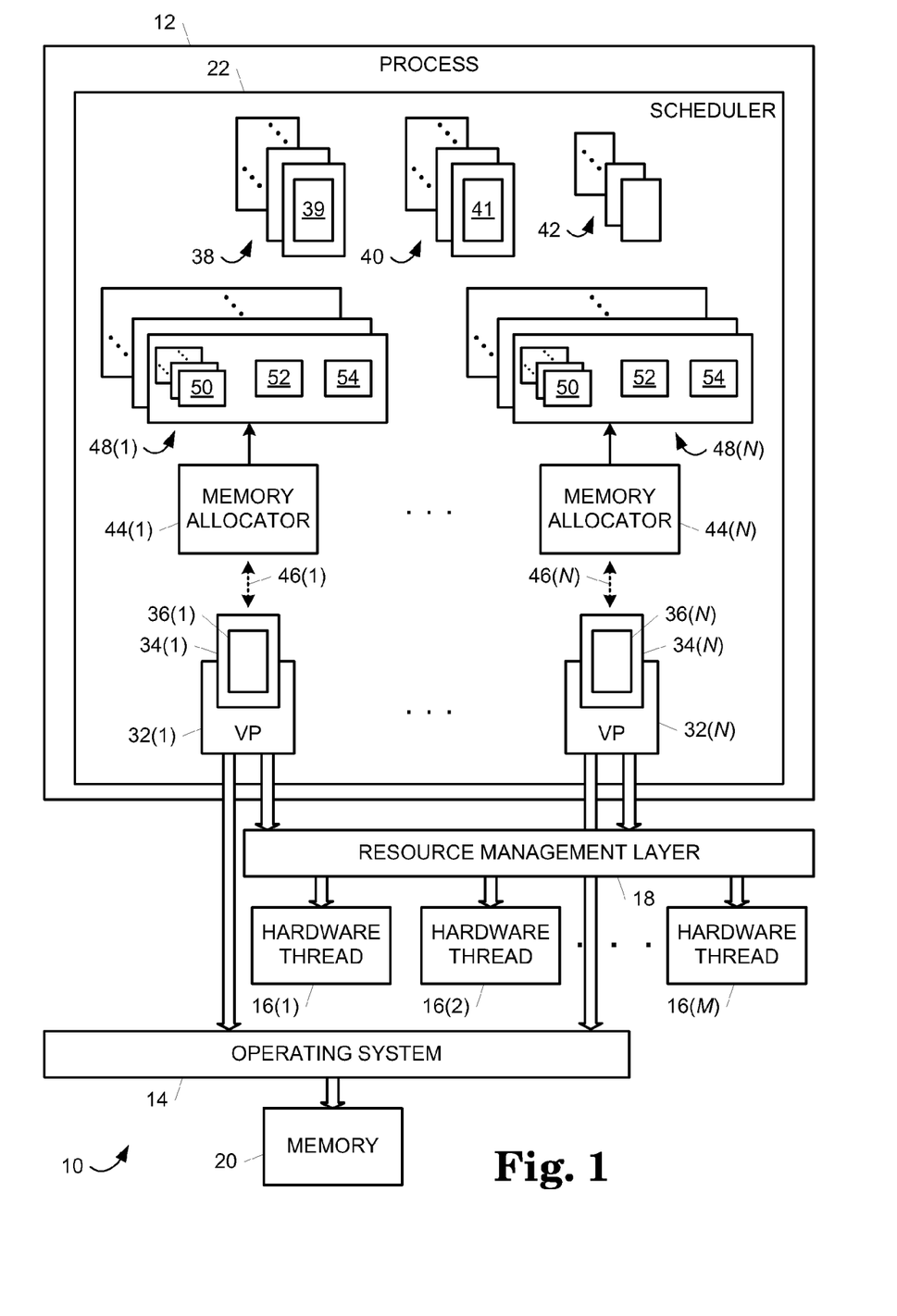
FIG. 1 is a block diagram illustrating an embodiment of virtual processor memory allocators in a runtime environment.

FIG. 1 is a block diagram illustrating an embodiment of virtual processor memory allocators 44 in a runtime environment 10. A scheduler 22 includes a set of virtual processors 32(1)-32(N) with corresponding memory allocators 44(1)-44(N) as indicated by respective arrows 46(1)-46(N), where N is an integer greater than or equal to two and denotes the Nth virtual processor 32 or Nth local collection 44.

Runtime environment 10 represents a runtime mode of operation in a computer system, such as embodiments 100A and 100B of a computer system 100 shown in FIGS. 6A and 6B and described in additional detail below, where the computer system is executing instructions. The computer system generates runtime environment 10 from a runtime platform such as a runtime platform 122 shown in FIG. 6A and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), a resource management layer 18, and a memory system 20. Runtime environment 10 allows tasks from process 12 to be executed, along with tasks from any other processes that co-exist with process 12 (not shown), using OS 14, resource management layer 18, and hardware threads 16(1)-16(M). Runtime environment 10 operates in conjunction with OS 14 and/or resource management layer 18 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads). Process 12 obtains access to the processing and other resources in the computer system (e.g., hardware threads 16(1)-16(M) from OS 14 and/or resource management layer 18. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread (or analogous OS concept such as child process) that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to scheduler 22 and process 12 and allocates pages of memory system 20 to scheduler 22 and process 12 in conjunction with memory allocators 44. OS 14 may allocate pages of memory system 20 in any suitable fixed or variable sizes (e.g., pages of 4 kilobytes (KB) to 64 KB).

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource management layer 18 allocates processing resources to process 12 by assigning one or more hardware threads 16 to process 12. Resource management layer 18 exists separately from OS 14 in the embodiment of FIG. 1. In other embodiments, resource management layer 18 or some or all of the functions thereof may be included in OS 14.

Memory system 20 includes any suitable type, number, and configuration of volatile or non-volatile storage devices configured to store instructions and data. The storage devices of memory system 20 represent computer readable storage media that store computer-executable instructions including process 12, OS 14, and resource management layer 18. The instructions are executable by computer system to perform the functions and methods of process 12, OS 14, and resource management layer 18 described herein. Examples of storage devices in memory system 20 include hard disk drives, random access memory (RAM), read only memory (ROM), flash memory drives and cards, and magnetic and optical disks.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specifies a policy for scheduler 22.

Scheduler 22 interacts with resource management layer 18 to negotiate processing and other resources of the computer system in a manner that is transparent to process 12. Resource management layer 18 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes the set of virtual processors 32(1)-32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Prior to executing tasks, scheduler 22 obtains execution contexts 34 and 38 from runtime environment 10 or operating system 14. Available virtual processors 32 locate and execute execution contexts 34 and 38 to begin executing tasks. The set of execution contexts in scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion or a blocking point (e.g. waiting for a message or a stolen child task to complete) on virtual processors 32 before picking up new tasks. When a task unblocks, the task is re-scheduled to execute on an available virtual processor, possibly with priority given to choosing a virtual processor 32 on the hardware thread 16 where it executed before blocking, in the hope that the memory hierarchy (viz., cache hierarchy) already contains data that can be optimally reused. An execution context 34 executing on a virtual processor 32 may also unblock other execution contexts 40 by generating data, a message, or an event that will be used by another execution context 40.

Figure 4:
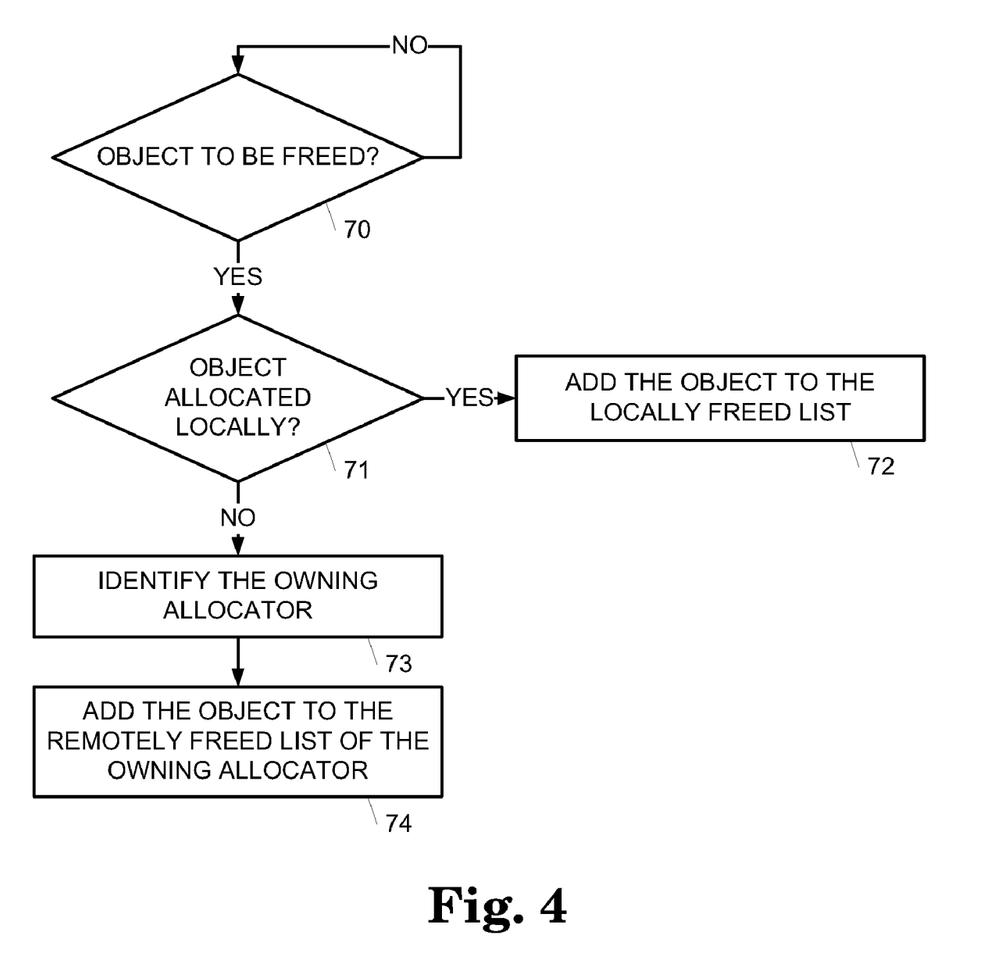
FIG. 4 is a flow chart illustrating an embodiment of a method for freeing allocated objects.

Each task in scheduler 22 may be realized (e.g., realized tasks 36 and 39), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 4 described below.

Upon completion, blocking, or other interruption (e.g., explicit yielding or forced preemption) of a task 36 associated with an execution context 34 running on a virtual processor 32, the virtual processor 32 becomes available to execute another realized task 39 or unrealized task 42. Scheduler 22 searches for a runnable execution context 38 or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all execution contexts 38 of scheduler 22 have been executed.

Scheduler 22 causes memory to be allocated to tasks 36 of execution contexts 34 executing on virtual processors 34 using memory allocators 44. In response to detecting memory allocation requests, virtual processors 32 of scheduler 22 initiate corresponding memory allocators 44. Each memory allocator 44 allocates all memory to tasks 36 of all execution contexts 34 that execute on a corresponding virtual processor 32. Accordingly, each memory allocator 44 may allocate memory to the same or different tasks 36 of the same or different execution contexts 34 at different times.

Figure 2:
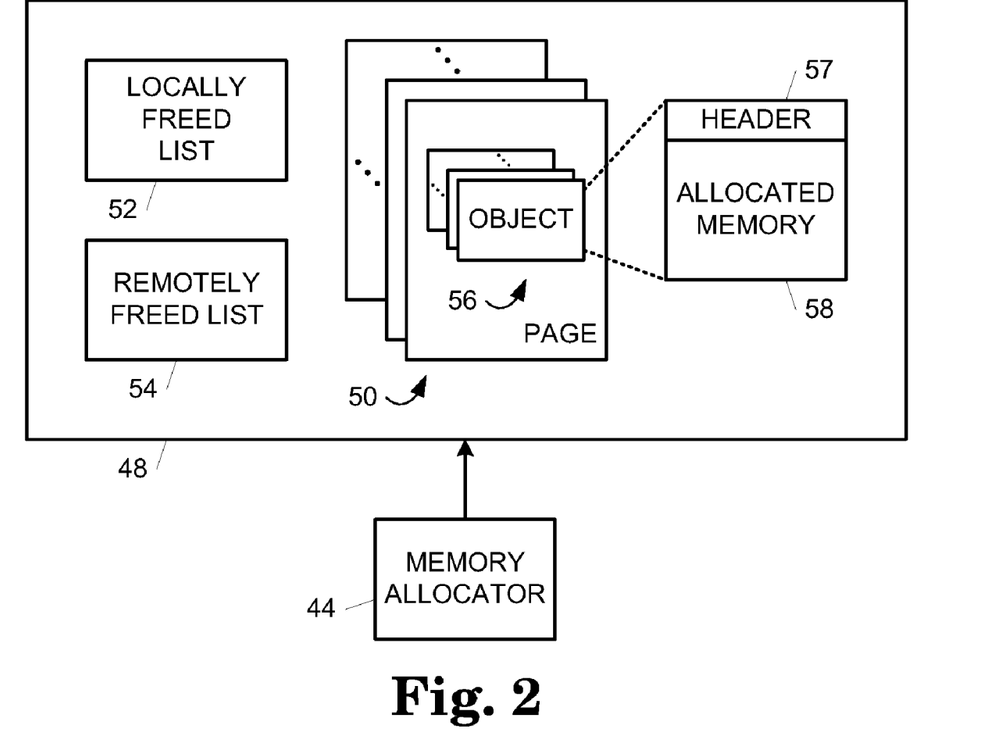
FIG. 2 is a block diagram illustrating an embodiment of memory allocation data structures.

Each memory allocator 44 includes an array of one or more pools 48 of memory pages 50. As shown in FIG. 2, each pool 48 includes one or more memory pages 50 allocated from OS 14, a locally freed list 52 and a remotely freed list 54. Each pool 48 includes a set of allocated, unallocated, and freed objects 56. Each object 56 includes a header 57 and allocated memory 58. Each header 57 includes information that identifies the virtual processor 32 and/or memory allocator 44 that allocated the corresponding allocated memory 58.

Locally freed list 52 identifies objects 56 of pages 50 in a pool 48 that have been freed locally by a corresponding virtual processor 32 (i.e., the virtual processor 32 that that corresponds to the memory allocator 44 that includes the pool 48). Each locally freed list 52 is only accessible by the corresponding virtual processor 32. Because each virtual processor 32 executes only one execution context 34 at any given time, the execution context 34 being executed is the only execution context that may cause locally freed list 52 to be accessed (i.e., two execution contexts cannot access locally freed list 52 simultaneously). Accordingly, a virtual processor 32 accesses locally freed list 52 without using synchronization mechanisms.

Remotely freed list 54 identifies objects 56 of pages 50 in a pool 48 that have been freed remotely by a non-corresponding virtual processor 32 (i.e., a virtual processor 32 that that does not correspond to the memory allocator 44 that includes the pool 48). Each remotely freed list 54 is accessible by all non-corresponding virtual processors 32. Accordingly, accesses to a remotely freed list 54 use synchronization mechanisms, such as atomic swapping of remotely freed list 54 with locally freed list 52, to prevent a corresponding and a non-corresponding virtual processor 32 from accessing remotely freed list 54 simultaneously.

In one embodiment, each pool 48 of the array is used for a fixed size of allocated objects (shown in FIG. 2). Array of pools 48 is indexed by the size of objects 56 allocated from each page 50. Accordingly, locally freed list 52 and remotely freed list 54 do not need to be ordered according to size in this in this embodiment. In other embodiments, array of pools 48 may be organized into any another suitable configuration.

Memory allocators 44 request and receive pages 50 from OS 14 independently from one another and separately allocate objects 56 to all tasks 36 of all execution contexts 34 executing on corresponding virtual processors 32. OS 14 may provide pages in predefined sizes of memory such as page sizes of 4 kilobytes (KB) to 64 KB to memory allocators 44. Memory allocators 44 allocate objects 56 from pages 50 for internal data structures (not shown) of scheduler 22 and tasks 36 associated with execution contexts 34 executing on virtual processors 32. Each memory allocator 44 attempts to allocate objects 56 from a corresponding locally freed list 52 before allocating objects 56 from a corresponding remotely freed list 54 or unallocated objects 56. By doing so, memory allocators 44 may enhance memory locality effects.

In one embodiment, memory allocators 44 may allocate objects 56 in accordance with object sizes requested for use by internal data structures of scheduler 22 (not shown) and tasks 36. In other embodiments, memory allocators 44 may allocate objects 56 in other suitable ways. For object sizes larger than a full page 50, memory allocators 44 may cause memory to be allocated in one or more whole pages from OS 14.

Respective virtual processors 32(1)-32(N) own respective memory allocators 44(1)-44(N) as indicated by respective arrows 46(1)-46(N). Each memory allocator 44(1)-44(N) only allocates objects 56 to tasks 36 associated with execution contexts 34 executing on respective virtual processors 32(1)-32(N). Memory allocator 44(1) only allocates objects 56 to tasks 36 associated with execution contexts 34 executing on virtual processor 32(1), memory allocator 44(2) only allocates objects 56 to tasks 36 associated with execution contexts 34 executing on virtual processor 32(2), and so on. Accordingly, respective memory allocators 44(1)-44(N) are associated exclusively with respective virtual processors 32(1)-32(N).

When a task 36 frees an allocated object 56, the virtual processor 32 executing the task 36 determines whether the memory allocator 44 corresponding to the virtual processor 32 allocated the object 56. In one embodiment, the virtual processor 32 makes this determination using header 57. In another embodiment, the virtual processor 32 makes this determination using an indirect association with the information of header 57 to minimize storage of header 57 or to optimize cache locality of header 57. If the memory allocator 44 corresponding to the virtual processor 32 allocated the object 56 (i.e., the object 56 was allocated locally), then the virtual processor 32 causes the allocated object 56 to be freed by adding the object 56 to the locally freed list 52 of the corresponding memory allocator 44. If the memory allocator 44 corresponding to the virtual processor 32 did not allocate the object 56 (i.e., the object 56 was allocated remotely), then the virtual processor 32 causes the allocated object 56 to be freed by adding the object 56 to the remotely freed list 54 of the memory allocator 44 that allocated the object 56. Freed objects 56 may be later reallocated by corresponding memory allocators 44.

Additional details of allocating and freeing objects 56 will now be described with reference to the embodiments of FIGS. 3 and 4, respectively.

Figure 3:
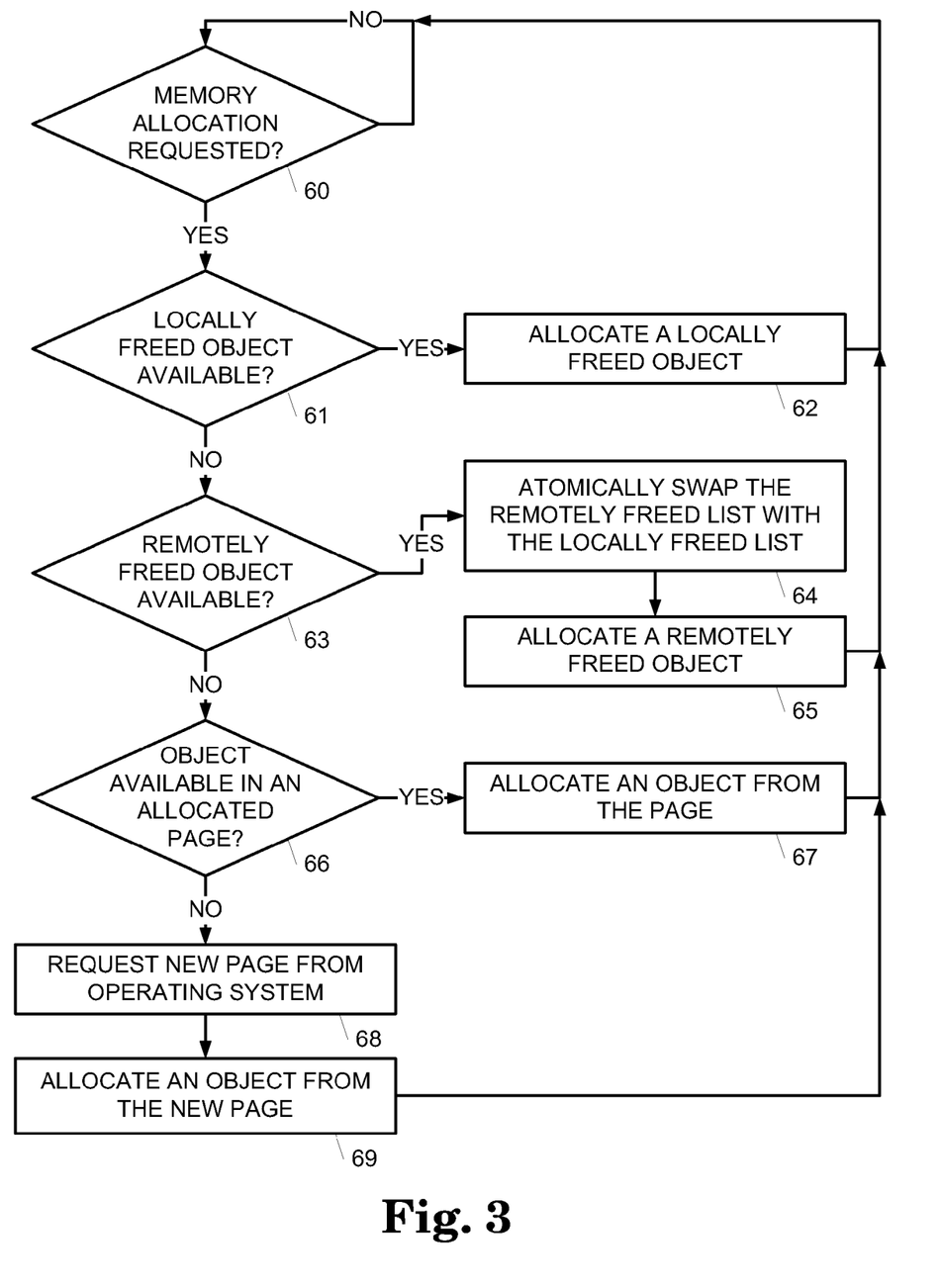
FIG. 3 is a flow chart illustrating an embodiment of a method for allocating objects.

FIG. 3 is a flow chart illustrating an embodiment of a method for allocating objects 56. A determination is made by memory allocator 44 as to whether a memory allocation has been requested as indicated in a block 60. Each memory allocation originates from a task 36 associated with an execution context 34 executing on a virtual processor 32. The memory allocator 44 corresponding to the virtual processor 32 detects the request.

Once a request is detected, a determination is made by memory allocator 44 as to whether a locally freed object 56 is available as indicated in a block 61. Memory allocator 44 accesses locally freed list 52 and determines whether an object 56 that is suitable for the allocation request (e.g., is of a suitable size) appears on locally freed list 52. If a locally freed object 56 is available, then memory allocator 44 allocates a locally freed object 56 from locally freed list 52 as indicated in a block 62.

If no objects 56 are present in locally freed list 52 (i.e., locally freed list 52 is empty), then a determination is made by memory allocator 44 as to whether a remotely freed object 56 is available as indicated in a block 63. Memory allocator 44 accesses remotely freed list 54 and determines whether an object 56 that is suitable for the allocation request (e.g., is of a suitable size) appears on remotely freed list 54. If a remotely freed object 56 is available, then memory allocator 44 atomically swaps remotely freed list 54 with locally freed list 52 as indicated in a block 64 and allocates a remotely freed object 56 from the locally freed list 52 as indicated in a block 65. Memory allocator 44 atomically swaps the empty locally freed list 52 for the given size of object 56 with the remotely freed list 54 for the same size of object 56.

If no objects 56 are present in locally freed list 52 (i.e., locally freed list 52 is empty) or remotely freed list 54 (i.e., remotely freed list 54 is empty), a determination is made by memory allocator 44 as to whether an object 56 is available in an allocated page 50 as indicated in a block 66. Memory allocator 44 determines whether an object 56 that is suitable for the allocation request (e.g., is of a suitable size) appears on an allocated page 50. If an object 56 is available in an allocated page 50, then memory allocator 44 allocates an object 56 from the allocated page 50 as indicated in a block 67.

If an object 56 is not available in an allocated page 50, then memory allocator 44 requests a new page 50 from OS 14 as indicated in a block 68 and allocates an object 56 from the newly allocated page 50 as indicated in a block 69.

FIG. 4 is a flow chart illustrating an embodiment of a method for freeing allocated objects 56. A determination is made as to whether an object 56 is to be freed as indicated in a block 70. When an object 56 is to be freed, a determination is made as to whether the object 56 was allocated locally as indicated in a block 71. An object 56 is allocated locally if the virtual processor 32 executing the task 36 that is attempting to free the object 56 corresponds to the memory allocator 44 that allocated the object 56 as indicated by the header 57 of the object 56. Virtual processor 32 determines whether an object 56 was allocated locally by examining the header 57 of the object 56. If the header 57 indicates that object 56 was allocated by the virtual processor 32 and/or memory allocator 44 attempting to free the object, then the object 56 was allocated locally. If the object 56 was allocated locally, then the object 56 is added to the locally freed list 52 as indicated in a block 72. Objects 56 may be added to locally freed list 52 without using synchronization mechanisms.

If the object 56 was allocated remotely, then the owning memory allocator 44 is identified as indicated in a block 73. An object 56 is allocated remotely if the virtual processor 32 executing the task 36 that is attempting to free the object 56 does not correspond to the memory allocator 44 that allocated the object 56. Virtual processor 32 examines the header 57 of the object 56 to identify the virtual processor 32 and/or memory allocator 44 that owns the object 56. The object 56 is added to the remotely freed list 54 of the owning memory allocator 44 as indicated in a block 74.

In the above embodiments, scheduler 22 may operate as a cooperative scheduler where process 12 and other processes are associated with virtual processors 32 in a controlled way. In other embodiments, scheduler 22 may operate as another type of scheduler such as a preemptive scheduler.

Although one instance of scheduler 22 was shown in the embodiment of FIG. 1, other embodiments may include other instances of scheduler 22 that each includes a different memory allocator 44 for each virtual processor 32.

The above embodiments may advantageously provide scalability, increase memory locality, minimize allocator overhead including synchronization overhead, and limit the inefficiencies caused by the number of memory allocators in a process.

When compared to methods that associate a memory allocator with each thread, the number of memory allocators may be reduced while still realizing the reduction in synchronization overhead that such methods may provide. The number of memory allocators in the above embodiments correspond to the number of virtual processors, and the number of virtual processors is typically bound by the number of hardware threads in a computer system. If the average inefficiency factor of a given memory allocator implementation is $C_i$, then the overall inefficiency of a process is $P_i(n)=n*C_i$, where n is the number of allocators in the process. With one allocator per thread, there is no upper bound on $P_i$, since there is no upper bound on the number of threads. With one allocator per processing resource, however, an upper bound is placed on $P_i$ by limiting n to the number of available processing resources multiplied by the number of scheduler instances, which is typically one or another small number. Thus, the above embodiments may result in a reduction in program-wide inefficiency.

Figure 5:
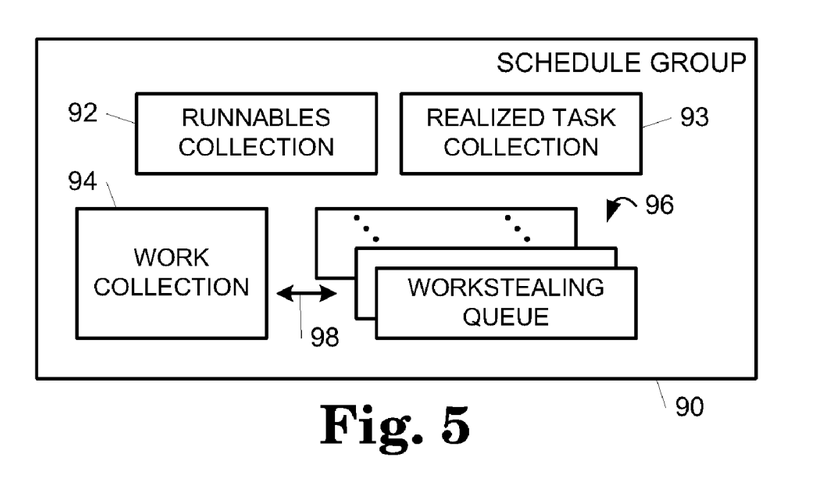
FIG. 5 is a block diagram illustrating an embodiment of a schedule group for use in a scheduler.

In one embodiment, process 12 organizes tasks into one or more schedule groups 90 and presents schedule groups 90 to scheduler 22. FIG. 5 is a block diagram illustrating an embodiment of a schedule group 90 for use in a scheduler 22.

Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 40 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42.

Using the embodiment of FIG. 5, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 40 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 40 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

Figure 6A:
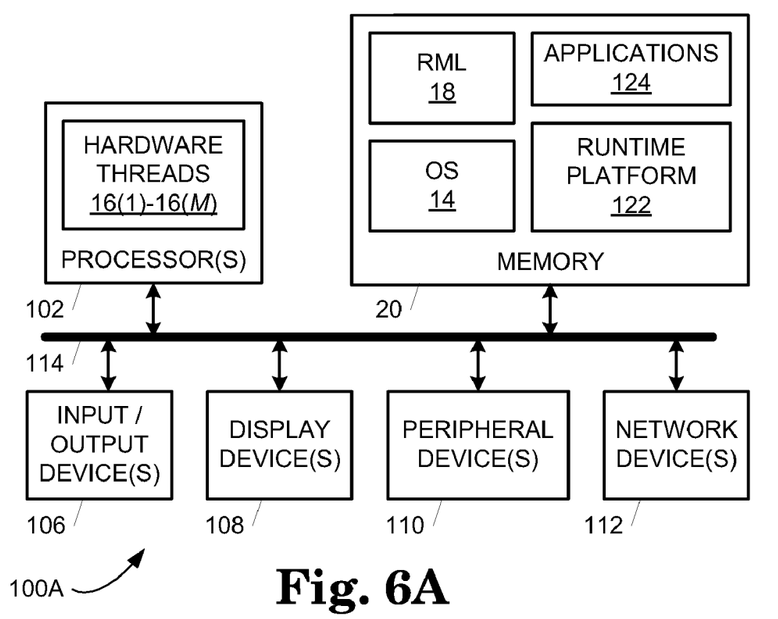
FIGS. 6A-6B are block diagrams illustrating embodiments of a computer system configured to implement a runtime environment with virtual processor memory allocators.
Figure 6B:
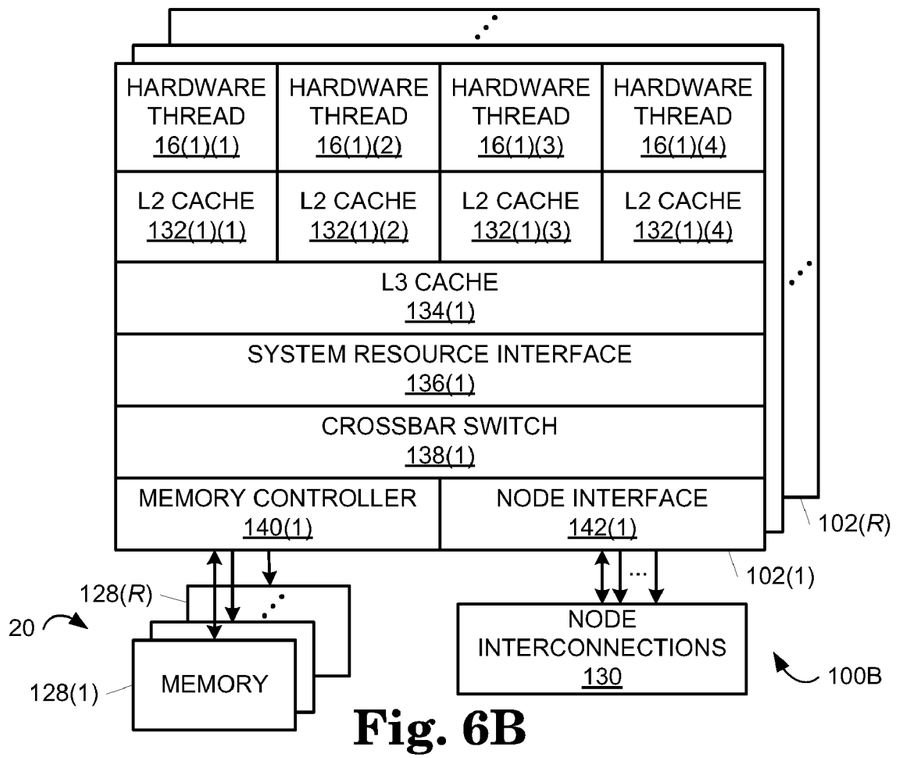

FIGS. 6A-6B are block diagrams illustrating embodiments 100A and 100B, respectively, of a computer system 100 configured to implement runtime environment 10 with virtual processor memory allocators 44(1)-44(N).

As shown in FIG. 6A, computer system 100A includes one or more processor packages 102, memory system 20 (also shown in FIG. 1), zero or more input/output devices 106, zero or more display devices 108, zero or more peripheral devices 110, and zero or more network devices 112. Processor packages 102, memory system 20, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100A represents any suitable processing device configured for a general purpose or a specific purpose. Examples of computer system 100A include a server, a personal computer, a laptop computer, a tablet computer, a personal digital assistant (PDA), a mobile telephone, and an audio/video device. The components of computer system 100A (i.e., processor packages 102, memory system 20, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 20. The instructions may include a basic input output system (BIOS) or firmware (not shown), OS 14 (also shown in FIG. 1), a runtime platform 122, applications 124, and resource management layer 18 (also shown in FIG. 1). Each hardware thread 16 may execute the instructions in conjunction with or in response to information received from input/output devices 106, display devices 108, peripheral devices 110, and/or network devices 112.

Computer system 100A boots and executes OS 14. OS 14 includes instructions executable by hardware threads 16 to manage the components of computer system 100A and provide a set of functions that allow applications 124 to access and use the components. In one embodiment, OS 14 is the Windows operating system. In other embodiments, OS 14 is another operating system suitable for use with computer system 100A.

Resource management layer 18 includes instructions that are executable in conjunction with OS 14 to allocate resources of computer system 100A including hardware threads 16 as described above with reference to FIG. 1. Resource management layer 18 may be included in computer system 100A as a library of functions available to one or more applications 124 or as an integrated part of OS 14.

Runtime platform 122 includes instructions that are executable in conjunction with OS 14 and resource management layer 18 to generate runtime environment 10 and provide runtime functions to applications 124. These runtime functions include a scheduler function as described in additional detail above with reference to FIG. 1. The runtime functions may be included in computer system 100A as part of an application 124, as a library of functions available to one or more applications 124, or as an integrated part of OS 14 and/or resource management layer 18.

Each application 124 includes instructions that are executable in conjunction with OS 14, resource management layer 18, and/or runtime platform 122 to cause desired operations to be performed by computer system 100A. Each application 124 represents one or more processes, such as process 12 as described above, that may execute with scheduler 22 that uses local collections 44(1)-44(N) as provided by runtime platform 122.

As noted above, memory system 20 includes any suitable type, number, and configuration of volatile or non-volatile storage devices configured to store instructions and data. The storage devices of memory system 20 represent computer readable storage media that store computer-executable instructions including OS 14, resource management layer 18, runtime platform 122, and applications 124.

Memory system 20 stores instructions and data received from processor packages 102, input/output devices 106, display devices 108, peripheral devices 110, and network devices 112. Memory system 20 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100A and output instructions or data from computer system 100A to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100A. Examples of display devices 108 include a monitor, a display screen, and a projector.

Peripheral devices 110 include any suitable type, number, and configuration of peripheral devices configured to operate with one or more other components in computer system 100A to perform general or specific processing functions.

Network devices 112 include any suitable type, number, and configuration of network devices configured to allow computer system 100A to communicate across one or more networks (not shown). Network devices 112 may operate according to any suitable networking protocol and/or configuration to allow information to be transmitted by computer system 100A to a network or received by computer system 100A from a network.

FIG. 6B is a block diagram illustrating embodiment 100B of computer system 100. Computer system 100B also includes at least processor packages 102 and memory system 20. Processor packages 102 include processor packages 102(1)-102(R) and memory system 20 includes memory devices 128(1)-128(R) where R is an integer than is greater than or equal to two and represents the Rth processor package 102 and Rth memory device 128. OS 14, runtime platform 122, applications 124, and resource management layer 18 may each be stored in any suitable ones of memory devices 128(1)-128(R).

In the embodiment of FIG. 6B, each processor package 102(1)-102(R) and respective memory device 128(1)-128(R) form a node. The nodes are interconnected with any suitable type, number, and/or combination of node interconnections 130.

Each processor package 102 includes a set of hardware threads 16(1)-16(4) where each hardware thread includes an L1 (level one) cache (not shown). Each processor package 102 also includes a set of L2 (level two) caches 132(1)-132(4) that correspond to respective hardware threads 16(1)(1)-16(1)(4). Each processor package 102 further includes an L3 (level three) cache available to the set of hardware threads 16(1)-16(4), a system resource interface 136, a crossbar switch 138, a memory controller 140, and a node interface 142. System resource interface 136 provides access to node resources (not shown). Crossbar switch 138 interconnects system resource interface 136 with memory controller 140 and node interface 142. Memory controller 140 connects to a memory device 128. Node interface 142 connects to one or more node interconnections 130.

In other embodiments, each processor package 102 may include other configurations and/or numbers of caches. For example, each hardware thread 16 may include two or more L1 caches in other embodiments and the L2 and/or L3 caches may or may not be shared in other embodiments. As another example, other embodiments may include additional caches (e.g., a level four (L4) cache) or fewer or no caches.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a process executing on a computer system, the method comprising:
    allocating, with a first memory allocator associated exclusively with a first processing resource of the computer system, first and second objects at different times to first and second execution contexts, respectively, executing on the first processing resource at different times including allocating the first object to the first execution context from a first page in response to the first locally freed list and the first remotely freed list being empty;
    allocating, with a second memory allocator associated exclusively with a second processing resource of the computer system, third and fourth objects at different times to third and fourth execution contexts, respectively, executing on the second processing resource at different times including allocating the third object to the third execution context from a second page in response to the second locally freed list and the second remotely freed list being empty;
    requesting the first page with the first memory allocator; and
    requesting the second page with the second memory allocator.

2. The method of claim 1 wherein:
    allocating the first object to the first execution context is in response to the first object appearing on a first locally freed list of the first memory allocator; and
    allocating the third object to the third execution context is in response to the third object appearing on a second locally freed list of the second memory allocator.

3. The method of claim 1 wherein:
    allocating the first object to the first execution context is in response to the first locally freed list being empty and the first object appearing on a first remotely freed list of the first memory allocator; and
    allocating the third object to the third execution context is in response to the second locally freed list being empty and the third object appearing on a second remotely freed list of the second memory allocator.

4. The method of claim 1 wherein:
    requesting the first page includes requesting the first page from an operating system with the first memory allocator; and
    requesting the second page includes requesting the second page from the operating system with the second memory allocator.

5. The method of claim 1 further comprising:
    freeing the first object with a fifth execution context executing on the first processing resource prior to allocating the first object to the first execution context.

6. The method of claim 5 further comprising:
    freeing the second object with a sixth execution context executing on the second processing resource prior to allocating the second object to the second execution context.

7. The method of claim 1 wherein the first and the second processing resources include first and second virtual processors, respectively.

8. A method performed by a process executing on a computer system, the method comprising:
    identifying a first processing resource of the computer system that caused a first object to be allocated from a first memory allocator exclusively associated with the first processing resource;
    freeing the first object with a second processing resource of the computer system by adding the first object to a remotely freed list of the first memory allocator;
    identifying the first processing resource that caused a second object to be allocated from the first memory allocator exclusively; and
    freeing the second object with the first processing resource by adding the second object to a locally freed list of the first memory allocator.

9. The method of claim 8 further comprising:
    identifying the second processing resource that caused a second object to be allocated from a second memory allocator exclusively associated with the second processing resource; and
    freeing the second object with the first processing resource.

10. The method of claim 8 wherein:
    allocating the first object to an execution context executing on the first processing resource is subsequent to freeing the first object with the second processing resource.

11. A computer readable storage medium storing computer-executable instructions that, when executed in a process of a computer system, perform a method comprising:
- initiating a first memory allocator configured to exclusively allocate a first plurality of objects at different times to a first plurality execution contexts executing on a first processing resource of the computer system at different times;
- initiating a second memory allocator configured to exclusively allocate a second plurality of objects at different times to a second plurality execution contexts executing on a second processing resource of the computer system at different times, the first and the second memory allocators including respective first and second sets of one or more pages of memory, respective first and second locally freed lists, and respective first and second remotely freed lists; and
- allocating one of the first plurality of objects from one of the first locally freed list and the first remotely freed list to one of the first plurality of execution contexts with the first memory allocator.

12. The computer readable storage medium of claim 11, the method further comprising:
- allocating one of the first plurality of objects from the first locally freed list to one of the first plurality of execution contexts with the first memory allocator.

13. The computer readable storage medium of claim 11, the method further comprising:
- allocating one of the first plurality of objects from the first remotely freed list to one of the first plurality of execution contexts with the first memory allocator.

14. The computer readable storage medium of claim 11, the method further comprising:
- allocating one of the first plurality of objects from one of the first set of pages to one of the first plurality of execution contexts with the first memory allocator.

15. The computer readable storage medium of claim 11, the method further comprising:
- freeing a first one of the first plurality of objects with the first processing resource; and
- freeing a second one of the first plurality of objects with the second processing resource.

* * * * *